March 28, 1939.    J. ARCELON    2,152,450
SWITCH
Filed Dec. 15, 1936
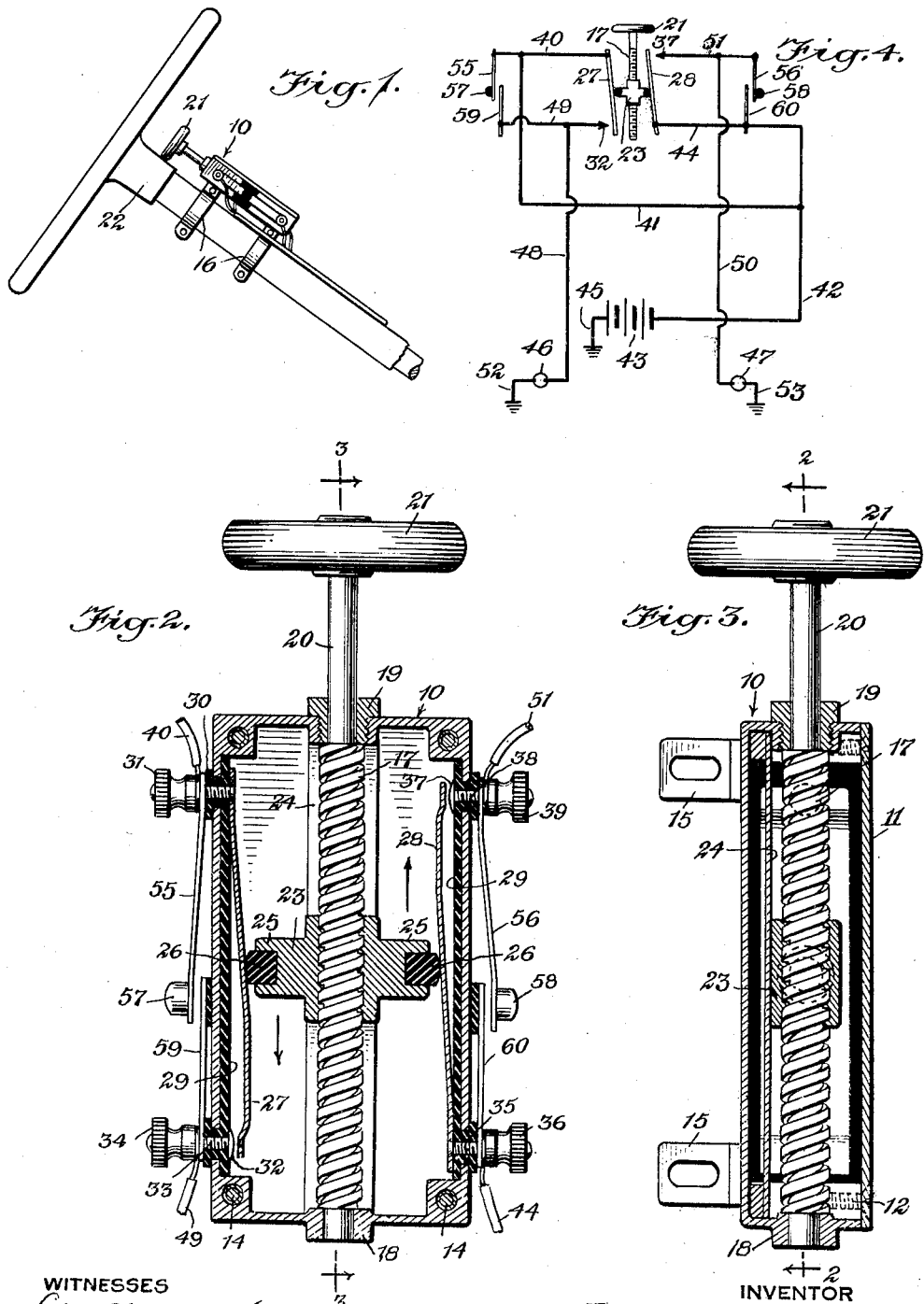
WITNESSES
INVENTOR
John Arcelon
BY
ATTORNEYS Patented Mar. 28, 1939

2,152,450

UNITED STATES PATENT OFFICE 2,152,450

SWITCH

John Arcelon, Mount Vernon, N. Y.

Application December 15, 1936, Serial No. 115,967

2 Claims. (Cl. 200—59)

This invention relates to improvements in switches, and has particular relation to switches for operating automobile signals such as is shown in my Patent No. 2,031,448.

It is an object of my invention to provide an improved switch which will cause the automatic operation of signals to indicate right and left turns of the vehicle, and which is also provided with auxiliary manually controlled switches for causing the operation of such signals.

It is a further object of this invention to provide an improved switch of this character which is of inexpensive but nevertheless rugged construction and will operate over a long period of time with comparative freedom from wear.

A further object is the provision of an improved switch which is automatically operated by the rotation of the steering wheel of an automobile so as to cause the successive or alternate operation of the signals, depending upon the rotational position of the steering wheel.

For a fuller understanding of the invention reference should be had to the accompanying drawing, in which:

Fig. 1 is a side elevation of a switch embodying my invention applied to the steering post of an automobile;

Fig. 2 is a plan view of the switch with the cover plate removed;

Fig. 3 is a longitudinal sectional view through the switch; and

Fig. 4 is a diagrammatic view of one type of circuit that may be used in connection with the switch.

My improved switch is preferably housed in a casing, such as that indicated at 10, having a removable cover plate 11 suitably secured in position as by means of the machine screws 12 which extend through the cover plate into the threaded openings 14 formed at the corners of the casing. The under-surface of the casing is preferably provided with brackets 15 having openings therein for connecting the casing to clamps 16 whereby the device may be releasably attached to the steering post of an automobile as shown in Fig. 1.

The switch mechanism comprises a screw-threaded shaft 17 mounted at one end in bearing 18 formed in the casing and at the other end extending through the bushing 19 secured in the casing. The end 20 of the shaft which extends through the bushing 19 is preferably not threaded and at the end thereof is attached a wheel or disk 21 having a periphery formed of some suitable anti-frictional material such as rubber or the like. The wheel or disk 21 is of such a size and is so positioned with respect to the casing that it is adapted to engage the hub 22 of the steering wheel and to be rotated thereby as shown in Fig. 1. Rotation of the steering wheel causes rotation of the hub 22 and the consequent rotation in an opposite direction of the wheel 21 and the screw-threaded shaft 17.

Mounted inside the casing on the screw-threaded shaft 17 is the switch control member 23 which is provided with a central opening or core threaded to the shaft 17, with the result that any rotation of the shaft 17 will cause a feeding or shifting of the member 23. Adjacent the bottom of the casing and parallel to and beneath the shaft 17 is a flat strip 24 which engages the flat under-surface of the member 23, serving as a track therefor. The strip 24 thereby prevents rotation of the member 23 when the shaft 17 is rotated, with the result that any rotation of the shaft 17 will cause a feeding or shifting of the member 23. The member 23 is provided with two outwardly projecting wings 25 extending in opposite directions and provided with contact members 26 formed of some suitable insulating material.

Secured along the two sides of the casing 10 and positioned so as to be controlled and operated by the member 23 are the contact strips 27 and 28 formed of a spring metal, each strip being attached at one end to the side of the casing. So that the strips will be alternately operated, strip 27 is attached at the end opposite to the strip 28. Thus the strip 27, as viewed in Fig. 2, is attached at its upper end, while the strip 28 is attached at its lower end. Each of the strips is suitably insulated from the casing as by the insulating members 29.

At its upper end the strip 27 is connected to the threaded terminal or conductor 30 having a knurled cap 31 threaded thereto, the terminal and cap both being suitably insulated from the casing. Adjacent the lower end of the strip 27 and in a position to be engageable thereby, a fixed contact 32 is provided which is connected to the end of a threaded terminal 33 likewise having a knurled cap 34 threaded thereto. It will be seen that when the wheel or disk 21 is rotated in counter-clockwise direction the member 23 will be fed downwardly, causing the member 26 to press against the contact strip 27 until it engages the fixed contact member 32, thereby closing the circuit between the terminals 30 and 33. When the wheel or disk 21 is then rotated in clockwise direction to raise the member 23 upwardly, the contact strip 27 due to its inherent resiliency will break the contact when the member 23 reaches the central portion of the casing.

The strip 28 is connected at its lower end to the terminal 35 which has threaded thereto the knurled cap 36, while adjacent the upper end of the strip 28 a fixed contact 37 corresponding to the contact 32 is provided, contact 37 being formed at the end of terminal 38 having a knurled cap 39 threaded thereto. When the wheel or disk 21 is rotated in a clockwise direction so as to shift the member 23 above the central portion of the casing, the insulated member 26 will press against the contact member 28, causing the strip to engage the fixed contact 37, thereby closing the circuit between the terminal 38 and the terminal 35. Each of the terminals 30, 33, 35 and 38 and their associated knurled caps are suitably insulated from the casing.

It will be seen that by attaching the switch to the steering wheel post, as indicated in Fig. 1, in such a manner that the wheel or disk 21 engages the hub 22, rotation of the steering wheel will cause shifting of the member 23 and closing of one or the other of the circuits. Thus if the steering wheel is turned in a clockwise direction to steer the vehicle to the right, it will cause the disk 21 and threaded shaft 17 to turn in a counter-clockwise direction shifting the member 23 downwardly, with the result that the pressure of the insulated member 26 against the contact strip 27 will cause the contact strip 27 to engage the fixed contact 32. When the steering wheel is then turned in a counter-clockwise direction, the member 23 will gradually be caused to shift upwardly, and when the steering wheel has been turned sufficiently so that the vehicle is driving in a straight-forward direction, the member 23 will then be in the neutral position shown in Fig. 2 with the circuit of both of the contact strips 27 and 28 open. If the steering wheel is further turned in a counter-clockwise direction so as to steer the vehicle towards the left, the member 23 will be shifted above the center of the casing, and the resultant pressure of the insulating member 26 against the contact strip 28 will cause the contact strip to engage the fixed contact 37, thereby closing that circuit.

It will be seen that the terminals 30 and 33 and the terminals 35 and 38 can be connected to suitable signaling apparatus for indicating right and left turns such as lights positioned on the right and left fenders, respectively, of an automobile, front and rear of the automobile, and in this manner the operation of the signals will be automatically caused by the steering of the automobile.

An illustrative circuit is shown in Fig. 4, in which the contact strip 27 is connected by means of wires 40, 41 and 42 to one side of a suitable source of current supply such as the battery 43, while the contact strip 28 is connected by the wires 44 and 42 to one side of the battery 43. The other side of the battery is grounded as indicated at 45. The two lamps illustrated at 46 and 47 are to indicate right and left turns, respectively, the lamp 46 being connected by wires 48 and 49 to the fixed contact 32. The lamp 47, on the other hand, is connected by wires 50 and 51 to the fixed contact 37. The lamps 46 and 47 are also connected as indicated at 52 and 53 to a suitable ground.

It will be seen by the wiring circuits shown in Fig. 4 that when the member 21 is rotated in a counter-clockwise direction the member 23 will be shifted downwardly so as to close the circuit of the lamp 46, thereby indicating a right turn. Likewise when the disk 21 and shaft 17 are rotated in a clockwise direction so as to shift the member 23 above the central neutral position, the circuit of the lamp 47 will be closed, thereby indicating a left turn.

In addition to the mechanism heretofore described for causing the automatic operation of the signals when the steering wheel is turned either to the right or left, I provide manually operated switches for causing the operation of the signals 46 and 47 at any desired time. These switches consist of spring contact strips 55 and 56 secured to the terminals 30 and 38, respectively, and having the operating knobs 57 and 58 secured at their free ends. Extending upwardly from the terminals 33 and 35, respectively, are the fixed contact strips 59 and 60, the upper ends of which are positioned beneath the lower ends of the contact strips 55 and 56. Each of the strips 55, 56, 59 and 60 are insulated from the casing as shown.

It will be seen that by applying pressure to the knob 57 contact strip 55 will be forced into engagement with the strip 59, thereby completing the circuit between the terminals 30 and 33. Likewise when pressure is applied to the knob 58 the contact strip 56 will be forced into engagement with the strip 60, completing the circuit between the terminals 35 and 38.

By means of the mechanism last described the respective signals 46 and 47 can be operated at any desired time by applying pressure to the knobs 57 and 58. Thus where it is desired to operate the signals when approaching the corner but prior to actual rotation of the steering wheel, the switches can be manually operated. The connection of the manually operated switches in the electrical circuit is clearly shown in Fig. 4 where it is seen that the strip 55 is connected to wire 40 and the strip 59 to wire 49. The contact strip 56 is connected to the wire 51, while the strip 60 is connected to the wire 44. In this way the operation of the switches can be both manually and automatically controlled.

It will be appreciated from the illustrated and described embodiment of my invention that I have provided an improved switch which operates in a positive manner in response to either automatic or manual control to cause the operation of signals for indicating the turning of a vehicle. Modifications may be made in the illustrated and described embodiment of my invention without departing from the invention as defined in the accompanying claims.

I claim:

1. In a switch, a rotatable screw-threaded shaft, a pair of circuit makers and breakers comprising fixed contacts positioned on opposite sides of the shaft adjacent the opposite ends thereof, and spring metal contact strips on the two sides of the shaft engageable with the fixed contacts, and a switch-actuating member mounted on and threaded to said shaft and held against rotation so as to be shifted upon the rotation of the shaft, said switch-actuating member having portions formed of insulating material and engageable with one of the contact strips to shift it into engagement with its fixed contact upon the rotation of the shaft a predetermined amount in one direction, and engageable with the other contact strip so as to shift it into engagement with its fixed contact upon the rotation of the shaft a predetermined amount in the other direction.

2. A switch of the type specified in claim 1, which is provided with manually-operated means for closing the circuit makers and breakers.

JOHN ARCELON.